United States Patent [19]

Wainwright

[11] 4,266,856
[45] May 12, 1981

[54] REAR VIEW MIRROR

[76] Inventor: Basil E. Wainwright, 80 Greenaleigh Rd., Yardley Wood, Birmingham, England

[21] Appl. No.: 2,084

[22] Filed: Jan. 9, 1979

Related U.S. Application Data

[63] Continuation-in-part of Ser. No. 926,428, Jul. 20, 1978, abandoned.

[51] Int. Cl.³ ............................................. G02B 17/00
[52] U.S. Cl. ................................................... 350/281
[58] Field of Search ............... 361/161; 350/281, 279, 350/277, 302, 303, 307, 283, 280, 289; 250/205; 248/481

[56] References Cited

U.S. PATENT DOCUMENTS

| | | | |
|---|---|---|---|
| 3,152,216 | 10/1964 | Woodward | 361/161 |
| 3,612,666 | 10/1971 | Rabinow | 350/281 |
| 3,680,951 | 8/1971 | Jordon et al. | 350/281 |
| 3,846,016 | 11/1974 | Firstenberg | 350/277 |

FOREIGN PATENT DOCUMENTS

| | | | |
|---|---|---|---|
| 964252 | 3/1975 | Canada | 350/257 |
| 1363070 | 8/1974 | United Kingdom | 350/281 |

Primary Examiner—John K. Corbin
Assistant Examiner—B. Wm. de los Reyes
Attorney, Agent, or Firm—Laubscher & Laubscher

[57] ABSTRACT

A motor vehicle rear view mirror is disclosed having a mirror glass which pivots automatically from a normal position to an anti-glare position in response to headlight glare. The glass is mounted between a front frame and a back plate of a two part housing and carries a magnetic member for co-operating with a solenoid coil of an electrical assembly. The electrical assembly is formed as a single unit mounted in the back plate and includes a photosensor receiving light through a partly silvered region of the mirror glass. A signal from the photosensor is amplified by one or more transistors to energize the solenoid coil. A pair of switch contacts is actuated when the mirror glass changes its position to the anti-glare position and is arranged to reduce current flow in the coil to a level just sufficient to hold the mirror glass in the anti-glare position. The rear of the mirror housing is coupled to a mounting arm by a ball and socket joint, the socket comprising an elongate bore having an inwardly tapering section to receive balls of various diameters. A locking member is secured in the bore in order to retain the ball in the bore.

15 Claims, 9 Drawing Figures

REAR VIEW MIRROR

CROSS REFERENCE TO RELATED APPLICATION

The application is a continuation in part of application Ser. No. 926,428 now abandoned filed July 20, 1978.

BACKGROUND OF THE INVENTION (1) Field of the Invention

This invention relates to a rear view mirror for a motor vehicle, which is movable automatically between a normal viewing position and an anti-glare position in which glare from light reflected from the mirror is reduced.

(2) Description of the Prior Art

Automatically adjusting rear view mirrors are known as shown by the following patents in which such mirrors have been proposed.

U.S. Pat. No. 3,152,216 to M. L. Woodward

W. German Offenlegungsschrift No. 2 133 182 to G. Paul

British Pat. No. 1 346 483 to K. A. Grell

French Pat. No. 1 463 007 to Chipoff et Perrier U.S. Pat. No. 3,152,216 discloses an automobile rear view mirror comprising a housing that receives a mirror glass and an arrangement which automatically pivots the mirror from its normal viewing position to an anti-glare position in response to headlights of a following car shining into the mirror. The mirror glass has an unsilvered portion to which is attached a photodetector for detecting light incident on the mirror. The assembly of the photodetector and the mirror glass is mounted on a metal plate which is pivotally mounted on a bracket centrally of the mirror glass, the bracket being mounted in the housing. The bracket also carries an electrical circuit including a thermionic valve responsive to the photodetector and which drives a relay to operate in response to a predetermined light level incident on the photodetector. The relay is arranged to switch electric current to a solenoid coil in such a manner that the coil attracts the metal plate and thereby pivots the mirror to its anti-glare position.

A disadvantage of this prior art mirror is that it is relatively complex and expensive to produce particularly because the photodetector has to be mounted separately from the rest of the circuitry on a separate bracket on the mirror, and also because metal pivot joints and a metal bracket are required to pivotally mount the mirror in the housing. Also, the valve driven circuitry is relatively bulky and is relatively insensitive to incident light due to the fact that it requires a relay to switch current to the solenoid coil.

SUMMARY OF THE INVENTION

It is an object of the present invention to provide an improved automatically adjusting rear view mirror for a motor vehicle which is of a less complicated construction and is relatively inexpensive to produce.

It is another object of the invention to provide an automatically adjusting rear rear mirror having a more sensitive electrical circuit which is of a simpler physical construction.

It is a further object of the invention to provide a rear view mirror with a simpler pivotal mounting of the mirror glass.

The present invention provides a rear view mirror for a motor vehicle, including a housing in which a mirror glass is pivotally mounted for movement between a normal viewing position and an anti-glare position in which glare from light reflected from the mirror is reduced, a solenoid coil for moving the mirror glass to the anti-glare position, and a photosensor for responding to light incident on the mirror, wherein in accordance with one aspect of the invention, the photosensor, associated drive circuitry and the solenoid are formed as a single unit on a circuit board. The formation of this electrical assembly as a single unit provides for a very significant cost advantage during assembly of the mirror because the electrical components of the mirror can be dropped into and secured in the mirror housing as a simple operation during assembly of the mirror.

In accordance with another aspect of the invention, the mirror housing consists of a back plate part and a front frame which co-operate to define a pivotal mounting for the mirror glass. The mirror glass is received between these two housing parts such that the glass is pivotally mounted at one of its edges by the housing parts. This arrangement simplifies the structure and manufacturing steps required to assemble the mirror. After installation of the electrical assembly in the back plate part of the housing, the mirror glass is dropped into the back plate part, and the front frame is installed, overcoming the requirement for the metal brackets and the metal pivot joints of the prior art aforesaid.

In accordance with another aspect of the invention, the electrical assembly includes a circuit arrangement which comprises means to receive an electrical supply from the vehicle and to connect the supply to the photosensor, means responsive to the supply and arranged to establish a reference voltage, an operational amplifier arranged to compare the output voltage with the reference voltage, and a transistor responsive to the output of the operational amplifier for controlling the flow of electrical current through the solenoid coil. This circuit arrangement has the advantage of overcoming the requirement of the relay of the prior art and provides for a more sensitive circuit. The circuit arrangement also has the advantage that together with the photosensor it can be arranged to be sensitive to tungsten light but not to sodium light which provides for discrimination against light from street lamps.

Other features, objects and advantages of the invention will appear from the following description of preferred embodiments thereof given by way of illustrative example with reference to the accompanying drawings.

DESCRIPTION OF PREFERRED EMBODIMENTS

Referring to FIGS. 1 to 4 there is shown a rear view mirror comprising a housing 2 formed as a synthetic plastic molding in two parts, namely a back plate part 4 and a front frame part 6. Located between the two parts of the housing is a mirror glass 8 movable between a normal viewing position (FIG. 2) and an anti-glare position (FIG. 3) in which glare from light reflected from the mirror is reduced. The mirror is pivotable about a pivot 10. An electrical assembly also includes a solenoid coil 16 which is energized in response to light incident upon the mirror above a predetermined intensity, the coil co-acting with a magnetic member 18 carried by the mirror glass to move the mirror glass from its normal position to an anti-glare position when the solenoid is energized. The mirror glass is held in its normal position in normal operation by means of a return spring 20. The mirror is mounted to the motor vehicle by means of a mounting arm 22 attached to the rear of the housing 2.

Figure 4:
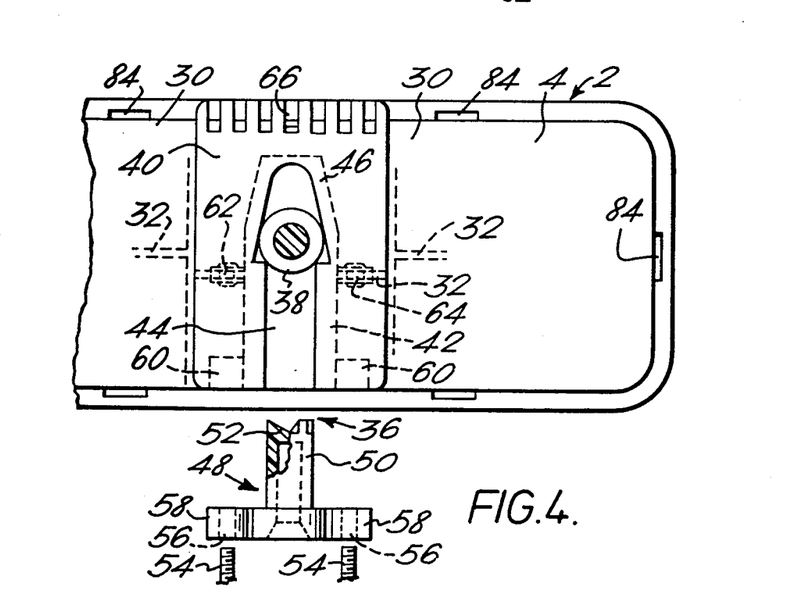
FIG. 4 is an exploded view on an enlarged scale of a ball and socket joint at the rear of the mirror housing coupling a mounting arm to the mirror.

Referring now in more detail to the construction of the housing, back plate 4 is in the form of a tray with rear walls 30 (FIG. 4) tapering to provide a deepened portion at the center of the tray. Reinforcing ribs 32 are provided for strengthening the tray and the centre of the tray carries three fixing studs 34 to retain the electrical assembly 12. The rear of the back plate provides a socket 36 of a ball and socket joint which serves to receive a ball member 38 of mounting arm 22. Mounting arm 22 is thus held mounted to back plate 4 by means of a universal ball and socket joint. Socket 36 is designed to permit various configurations of mounting arms having different size end portions to be mounted to the back plate. Referring to the construction of socket 36 as shown in FIG. 4, a boss portion 40 at the rear of the back plate has a vertical bore 42 of circular section which communicates with a slot 44 in the surface of the boss to permit the mounting arm 22 to extend from the bore 42. The top portion of the bore 42 is tapered as at 46 to permit ball joints of different sizes to make a good fit with the bore. This may occur where a motor vehicle has already installed an appropriate mounting arm. A locking member 48 is provided having a cylindrical portion 50 making a reasonably close fit within bore 42 and having a recessed top portion 52 providing a seat for ball 38. Locking member 48 is locked in position by means of two self tapping screws 54 extending through apertures 56 in wing portions 58 of locking member 48. Wing portions 58 are arranged to fit within recesses 60 of boss 40 and screws 54 extend into the interior of back plate 4 to extend through registering apertures 62 in a reinforcing rib 32. Apertured spring steel clips 64 are mounted over apertures 62 in order to receive screws 54 and to engage the threads thereof so that screws 54 can be tightened to secure the locking member 48. The top of boss 40 has a ribbed surface 66. Mounting arm 22 shown has a flat surface 70 which may be adhesively mounted by means of an adhesive pad to the window of a motor vehicle. Reinforcing ribs 72 are provided on the other side of surface 70 in order to strengthen the surface and to prevent warping.

The front surface of back plate member 4 has at its base an aperture 80 through which part of the electrical assembly, a sensitivity adjustment thumb-wheel 82, projects. The front surface of back plate 4 has apertures 84 spaced around the surface which serve in the securing of the front frame 6 to back plate 4.

Front frame 6 is generally rectangular in configuration and possesses projecting nodules 86 around its periphery which interengage with recesses 84 in back plate 4 as a snap fit in order to secure together back plate 4 and front frame 6. Front frame 6 has a recessed portion 88 in order to receive mirror glass 8. A further recessed portion 90 extends along the lower edge of the front of back plate 4 and co-operates with recess 88 in order to provide a longitudinal U-shaped recess. This U-shaped recess serves to support the lower edge of mirror glass 8 and to permit the mirror glass to pivot about pivot 10. As an alternative arrangement, recess 88 and recess 90 may be shaped to provide a recess circular in section and a cylindrical element may be provided to fit within the recess and to support the mirror glass 8, the lower edge of the mirror glass fitting within an axial slot in the cylindrical element.

Mirror glass 8 is of conventional construction. Mirror glass 8 is only partly silvered in the region 100 opposite photosensor 14 by providing a series of transparent lines in order to permit incident light to be transmitted through the mirror to photosensor 14. This arrangement provides a collimation effect for light passing through the mirror on to photosensor 14 and this renders the mirror more sensitive to light from headlamps of vehicles behind the motor vehicle containing the rear view mirror as compared with other lights for example courtesy lights within the motor car or street lighting.

The electrical assembly 12 is formed as a single unit and includes a board 104 upon which the other elements of the assembly are mounted. The board has apertures registering with studs 34 in order to secure the assembly to back plate 4. Locking clips 106 are provided to fit on studs 34. The assembly is powered from a suitable circuit (e.g. sidelight circuit) energized by the vehicle battery and leads will be fed through the back plate 4 in a suitable manner. Photosensor 14 which may comprise a photodiode is connected (see FIG. 5) to a potentiometer in the form of a thumb-wheel 82 which regulates the sensitivity of the electrical assembly, i.e. the thumb-wheel 82 predetermines the intensity of light incident upon the photosensor 14 at which the electrical assembly will be actuated to move the mirror to the anti-glare position. The movable contact 106 of thumb-wheel 82 is connected by a series resistance 108 and a reverse biased diode 110, connected between resistor 108 and ground, to the base of a transistor 112. The collector circuit of transistor 112 includes solenoid coil 16. A protection diode 114 is connected across solenoid coil 16. Solenoid coil 16 has a centre tapping which is connected to contacts 116.

Figure 1:
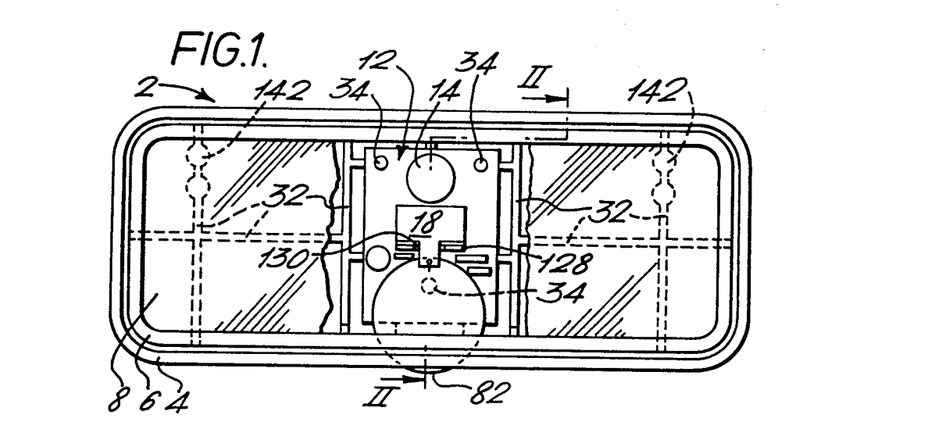
FIG. 1 is a front elevation of an embodiment of a rear view mirror according to the invention, with the mirror glass partly broken away to show internal details of the mirror.
Figure 2:
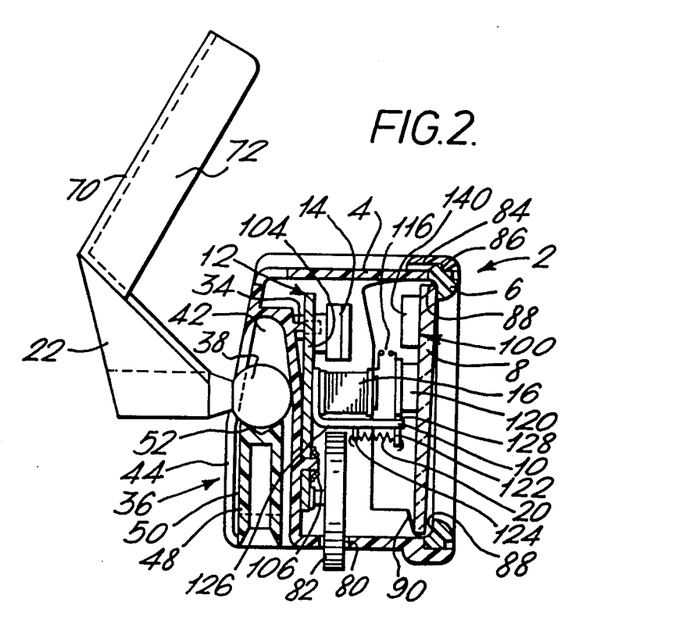
FIG. 2 is a cross-sectional view of the mirror taken along the line II—II of FIG. 1, the mirror glass being shown in the normal viewing position.
Figure 3:
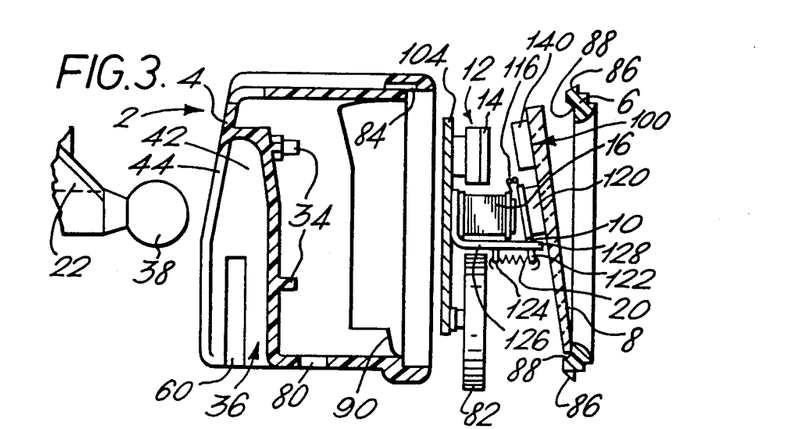
FIG. 3 is an exploded sectional view of the mirror along the line II—II of FIG. 1, the mirror glass being shown in the anti-glare position.

Contacts 116 are closed when glass 8 is moved to the anti-glare position and are shown schematically in FIGS. 2 and 3.

As can be seen in FIGS. 2 and 3 the physical disposition of the electrical assembly is such that the core of the solenoid 16 is disposed remote from magnetic member 18 in the normal rest position of the mirror. Magnetic member 18 is secured to the rear of mirror glass 8 by means of an adhesive pad 120 and the mirror glass is retained in the rest position by a return spring 20 coupled between an aperture in a depending tine 122 of magnetic member 18 and a tine 124 of an upstanding member 126. The edge 128 of member 126 remote from board 104 has a recess 130 to receive tine 122 which engages the base of the recess in order to provide said pivot 10 for the mirror.

Pads 140 adhesively secured to the mirror glass 8 are arranged to engage reinforcing ribs as at 142 in order to provide a buffer when mirror glass 8 moves to the anti-glare position.

In operation of the rear view mirror light from headlamps of a vehicle approaching the motor vehicle in which the rear view mirror is mounted may cause light to be incident upon the rear view mirror and this light will be transmitted to the photosensor 14. If the intensity of the light is above a level determined by the setting of potentiometer 82, sufficient current will be generated in resistor 108 to switch transistor 110 from its normal non-conductive state to a fully conductive state. This causes energizing current to flow in the solenoid 16, which creates an electromagnetic field to attract magnetic member 18 and to thus move mirror glass 8 about pivot 10 to the anti-glare position (FIG. 3) in which the amount of light reflected from the mirror glass to the driver of the vehicle is reduced. Now the amount of current required to flow in the solenoid coil to move the mirror to the anti-glare position is considerably more than that required to hold the mirror in the anti-glare position. Accordingly when mirror glass 8 moves to the anti-glare position, contacts 116 are closed which has the effect of shorting out part of coil 16 and thus causing a reduced current flow in the solenoid. This current flow is sufficient to hold the mirror glass in the anti-glare position for as long as light above the predetermined intensity shines on the mirror glass. Reduction of the current flow through the solenoid coil permits a longer life expectancy for the components of the circuit assembly.

Figure 5:
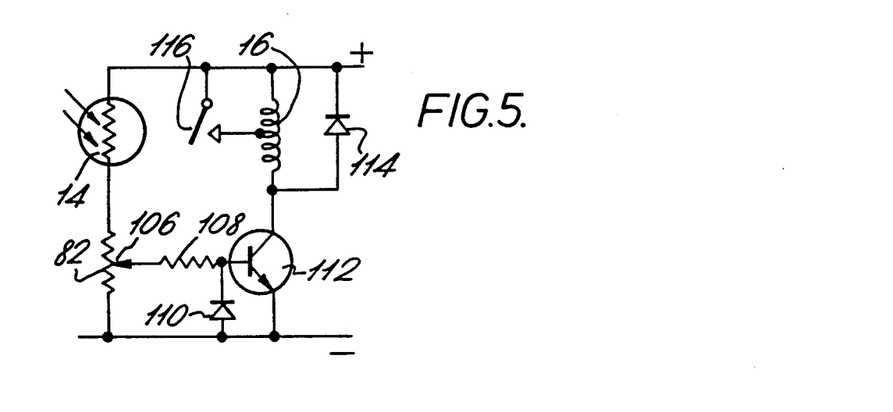
FIG. 5 is a circuit diagram of the electrical assembly of the mirror.
Figure 6:
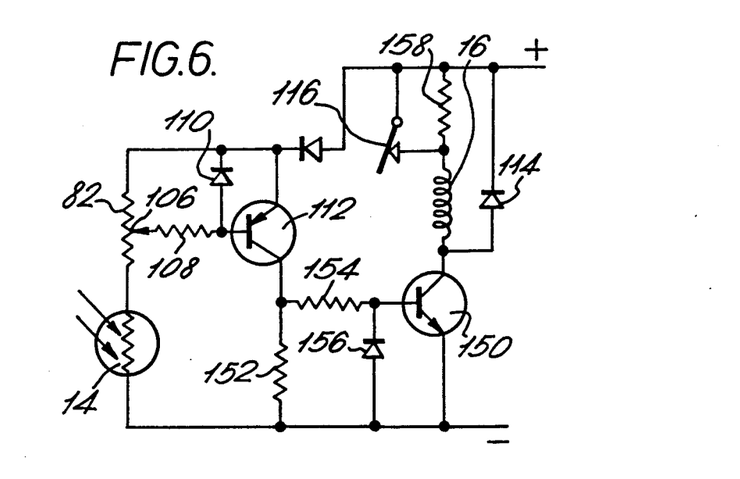
FIG. 6 is a circuit diagram of an alternative form of electrical assembly for the mirror.

In the alternative form of electrical assembly shown in FIG. 6, parts similar to those of FIG. 5 are indicated by similar reference numerals. Transistor 112 serves to amplify the current generated in resistor 108 and a main switching transistor 150 is coupled to the collector circuit of transistor 110 via resistors 152, 154 and diode 156. Coil 16 is connected in the collector circuit of transistor 150 together with a series resistor 158. Contacts 116 which are closed in the normal position of mirror glass 8 are connected across resistor 158. This alternative form has a higher sensitivity to incident light by virtue of the amplification provided by transistor 110. When the coil 16 is energized to move mirror glass to the anti-glare position, contacts 116 are opened so that resistor 158 is switched into coil 16 in order to reduce current flow through coil 16 and provide a holding current.

Figure 7:
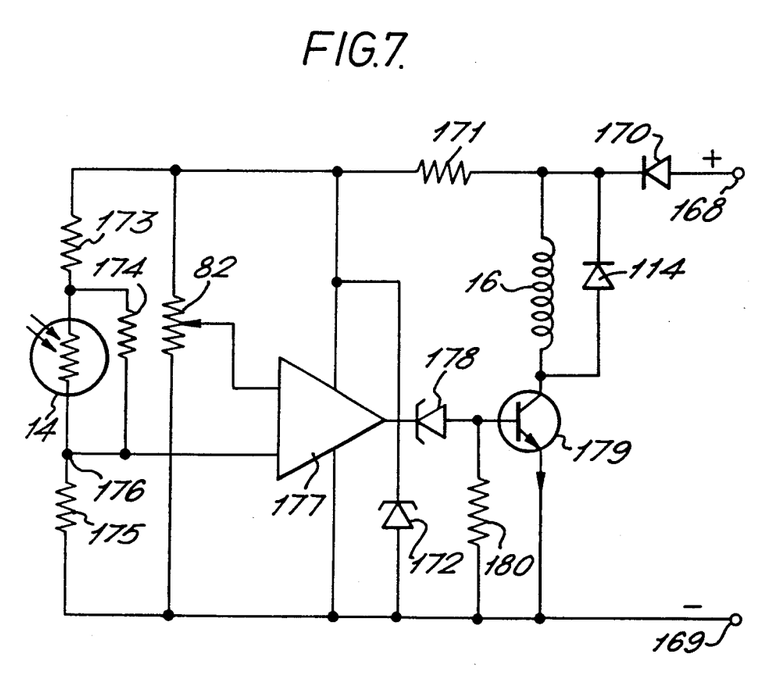
FIG. 7 is a front elevational view of another embodiment of rear view mirror according to the invention.
Figure 8:
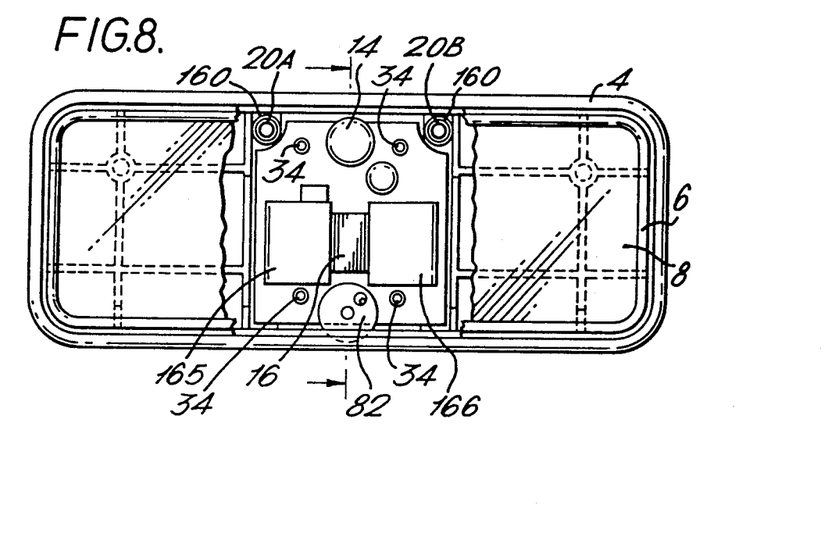
FIG. 8 is a cross-sectional view of the mirror of FIG. 7 taken along the line II—II.
Figure 9:
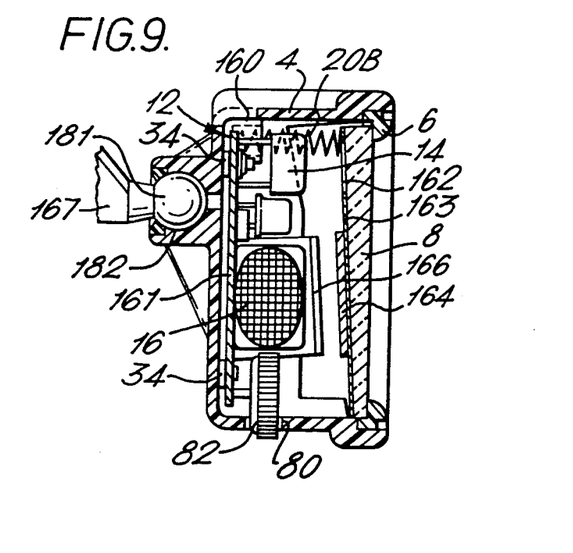
FIG. 9 is a circuit diagram of the electrical assembly of the mirror of FIGS. 7 and 8.

Another embodiment of a rear view mirror according to the invention is shown in FIGS. 7 to 9. This embodiment is generally similar to that previously described and like parts are marked with like reference numerals.

As is shown in FIGS. 8 and 9, the mirror comprises a housing 2 consisting of a back plate part 4 and a front frame part 6 each moulded in plastics material. The mirror glass 8 is located between the housing parts 4, 6 so as to be pivotally mounted at its bottom edge. Two return springs 20A, 20B urge the mirror glass 8 to pivot to a position abutting the frame 6 wherein the mirror glass is in its normal viewing position. The return springs 20 sit in cup shaped members 160 integrally moulded in the back plate part 4.

An electrical assembly 12 is mounted in the housing 2 on studs 34 at the back of the part 4, as by gluing. The electrical assembly 12 is formed as a single unit wherein all of the electrical components of the mirror are mounted on a single circuit board 161. As with the previously described embodiment, the electrical assembly 12 includes a photosensor 14 which receives light incident on the mirror glass 8 through an aperture 162 formed in the silvered layer 163 of the mirror glass, the assembly 12 further including a potentiometer 82 with an adjustable thumbwheel projecting through a slotted aperture 80 in the back plate 4, the potentiometer being for adjusting the sensitivity of the circuit to incident light, as previously described. The assembly further includes a solenoid coil 16 which co-operates with a metal plate 164 carried by the mirror to pivot the mirror to its anti-glare position.

The coil 16 of the FIGS. 8 and 9 embodiment differs from that of the FIGS. 1 to 4 embodiment in that its axis is arranged generally parallel to the plate of the circuit board 161, the coil having generally L-shaped pole pieces 165, 166 which present flat surfaces which abut the metal plate 164 when the mirror is in its anti-glare position. This coil arrangement has the advantage of allowing a coil of a substantial number of turns to be included in the housing 2 without increasing the distance between the mirror glass 8 and the rear of the back plate 4.

The back plate 4 is formed with an integral socket 181 which receives a ball 182 of a mounting arm 167.

The circuit included on the printed circuit board 161 is shown in detail in FIG. 7. The circuit is adapted to be connected to the vehicle's sidelight circuit through input terminals 168, 169. A protection diode 170 is provided to protect the circuit against an incorrect polarity connection being made between the sidelight circuit and the mirror. A resistor 171 and a zener diode 172 act as a current limiting arrangement to ensure that the voltage established between the input terminals 168, 169 does not exceed a predetermined maximum value e.g. 18 volts, so as to protect the circuit. The photosensor 14 is connected between the input terminals 168, 169 in a potentiometer chain including resistors 173 to 175, whereby the potential at point 176 in the chain increases with increased illumination. This potential is compared with a selectively variable reference potential established by the potentiometer 82, by means of an operational amplifier 177 connected as a comparator. The output of the operational amplifier 177 is connected to a zener diode 178 and hence to the base of a control transistor 179 which controls the current flowing in the solenoid coil 16. A resistor 180 provides a current path for both the base leakage current of the transistor 179 and the leakage current of the diode 178.

In use, when increased illumination causes the potential at point 176 to exceed the reference voltage set by the potentiometer 82, the output of the amplifier 177 goes high. When the output exceeds the threshold set by the zener diode 178, the transistor 179 is switched on, energizing the coil 16 which causes the mirror to move to its anti-glare position.

It will be seen that the described embodiments of the mirror can be assembled inexpensively and easily by virtue of the unitary nature of the electrical assembly 12 and the manner in which the mirror glass 8 is pivotally mounted at its edge by the housing parts 4 and 6. Thus, during assembly, the circuit assembly 12 is first attached to the rear of the back plate 4, the spring(s) 20 are appropriately installed, the mirror glass 8 is dropped into place, and front frame 6 is located in position. This simple construction method provides an extremely sensitive rear view mirror at reduced cost.

I claim:

1. A rear view mirror for a motor vehicle comprising
   (a) a housing including
      (1) a back plate portion (4); and
      (2) a front frame portion (6) connected with said back plate portion to define a chamber, said housing containing a recess in the inner surface of the lower portion thereof, said recess extending parallel with said front plate portion;
   (b) a mirror (8) pivotally mounted within said housing chamber, the lower edge of said mirror being arranged within said housing recess, said mirror being operable to pivot between a normal position wherein said mirror is arranged adjacent and generally parallel to said front frame portion, and an anti-glare position wherein said mirror diverges from said front frame portion in the direction of the upper edge of said mirror; and
   (c) means for pivoting said mirror between said normal and anti-glare positions, said pivoting means including
      (1) means (20) for biasing said mirror toward its normal position;
      (2) a unitary electrical assembly (12) mounted on said back plate portion within said housing, said assembly containing an electrical circuit including
         (a) a printed circuit board (104, 161);
         (b) a photosensor (14) mounted on said board for sensing light incident on said mirror,
         (c) a solenoid coil (16) connected with said photosensor;
         (d) means (168, 169) for supplying a voltage across said photosensor, said photosensor producing a voltage output corresponding with said incident light;
         (e) reference voltage means (82) connected with said voltage supply;
         (f) operational amplifier means (177) for comparing the photosensor output voltage with said reference voltage; and
         (g) transistor means (179) responsive to the output of said operational amplifier for controlling the flow of current through said solenoid coil; and
      (3) metallic plate means (164) mounted on the rear portion of said mirror, whereby when a sufficient amount of light strikes said photosensor, said solenoid coil generates a magnetic field which attracts said metallic plate means to pivot said mirror to its anti-glare position.

2. Apparatus as defined in claim 1, wherein the axis of said solenoid coil is arranged generally parallel to said circuit board.

3. Apparatus as defined in claim 1, wherein said solenoid coil includes pole pieces (165, 166) having surfaces adapted for abutting said metallic plate means.

4. Apparatus as defined in claim 1, wherein said electrical circuit further includes a first zener diode (178) connected with the output of said operational amplifier means for establishing a voltage threshold which the amplifier output must exceed to actuate said transistor means.

5. Apparatus as defined in claim 4, wherein said reference voltage means comprises a potentiometer to selectively vary said reference voltage.

6. Apparatus as defined in claim 5, wherein said electrical circuit further includes protection diode means (170) for protecting said circuit from being connected with an incorrect polarity to said voltage supply.

7. Apparatus as defined in claim 6, wherein said electrical circuit further includes a zener diode (172) for establishing a predetermined maximum potential difference applied to said circuit by said voltage suply means.

8. A rear view mirror for a motor vehicle, comprising
   (a) a housing including
      (1) a recessed back plate portion (4);
      (2) a front plate portion (6) adapted for connection with said back plate portion to define a chamber, said housing containing a recess (90) in the inner surface of the lower portion thereof, said recess extending parallel with said front plate portion;
   (b) a mirror (8) pivotally mounted within said housing chamber, the lower edge of said mirror being arranged within said housing recess, said mirror being operable to pivot between a normal position wherein said mirror is arranged adjacent and generally parallel to said front frame portion and an anti-glare position wherein said mirror diverges from said front frame portion in the direction of the upper edge of said mirror;
   (c) means (20) for biasing said mirror toward its normal position; and
   (d) means for pivoting said mirror toward its anti-glare position including
      (1) a unitary electrical assembly (12) mounted on said back plate portion within said chamber opposite the rear portion of said mirror, said assembly containing an electrical circuit including
         (a) a printed circuit board (104);
         (b) a photosensor (14) mounted on said printed circuit board for detecting light incident on said mirror;
         (c) a solenoid coil (16) for generating a magnetic field; and
         (d) transistor circuit means (112) for energizing said coil in response to incident light on the photosensor above a predetermined intensity; and
      (2) metallic plate means (18) mounted on the rear portion of said mirror opposite said electircal assembly, whereby when light above the predetermined intensity strikes said photosensor, said solenoid coil generates a magnetic field which attracts said metallic plate means, thereby pivoting said mirror to its anti-glare position.

9. Apparatus as defined in claim 8, wherein said electrical circuit includes a potentiometer (82) for controlling the predetermined intensity of light incident on said photosensor at which said coil is energized, said potentiometer being provided with an adjustable thumbwheel adapted to extend through a slot in said housing.

10. Apparatus as defined in claim 9, wherein said electrical circuit further includes holding circuit means (158) for reducing the level of energization of said coil and switch contact means (116) for operating said holding circuit means in response to initial energization of said coil.

11. Apparatus as defined in claim 8 wherein said housing further comprises means (84) for connecting said front frame portion with said back plate portion.

12. Apparatus as defined in claim 1, wherein said housing further includes a mounting arm (22) having a planar surface (70) at the free end thereof adapted for being adhesively secured to a planar surface of an automobile.

13. Apparatus as defined in claim 12, wherein said housing further includes means for connecting said mounting arm with said housing, said connecting means comprising (a) a socket (36) arranged in the outer surface of said back plate portion; and
(b) a ball member (38) connected with said mounting arm and arranged within said socket.

14. Apparatus as defined in claim 13, wherein said socket comprises an elongated bore (42) having a diameter decreasing in the inward direction, said connecting means further comprising a locking member (48) for securing said ball member within said socket.

15. Apparatus as defined in claim 14, wherein said housing and said locking member contain cooperating apertures (56, 62) and further comprising screw means (54) adapted to be received by said apertures for securing said locking member within said bore.

* * * * *